United States Patent [19]
Ling et al.

[11] Patent Number: 5,771,791
[45] Date of Patent: Jun. 30, 1998

[54] MULTIPURPOSE JUICE EXTRACTOR

[76] Inventors: Kuo-I Ling, 9F, No. 12, Alley 31, Che Lu To Street; Rong-Yuan Tseng, 10F, No. 3, Lane 65, Chung Hsiao Rd., both of San Chorng City, Taipei Hsien, Taiwan

[21] Appl. No.: 929,401

[22] Filed: Sep. 15, 1997

[51] Int. Cl.$^6$ .............................. A23N 1/00; A23N 1/02; A23L 1/212; A23L 2/06
[52] U.S. Cl. .............................. 99/492; 99/495; 99/513; 99/510; 241/37.5; 241/92; 241/101.2; 241/261
[58] Field of Search ..................... 99/492, 495, 509–513, 99/348; 100/37, 53, 98 R, 117, 121; 241/37.5, 92, 101.2, 261, 260.1, 101.1; 366/301–307, 318, 319

[56] References Cited

U.S. PATENT DOCUMENTS

| | | | |
|---|---|---|---|
| 3,736,865 | 6/1973 | Hait | 99/513 X |
| 3,892,365 | 7/1975 | Verdun | 241/92 |
| 4,183,293 | 1/1980 | Arao et al. | 99/512 |
| 4,506,601 | 3/1985 | Ramirez et al. | 99/511 |
| 4,872,404 | 10/1989 | Quetsch et al. | 99/495 X |
| 4,924,770 | 5/1990 | Raub | 99/511 |
| 5,031,524 | 7/1991 | Wettlaufer | 99/510 X |
| 5,353,697 | 10/1994 | Venturati et al. | 99/492 |
| 5,405,096 | 4/1995 | Seol | 241/282.1 |
| 5,408,922 | 4/1995 | Gupta | 99/511 X |
| 5,452,650 | 9/1995 | Lee | 99/510 |
| 5,592,873 | 1/1997 | Lee | 99/510 |
| 5,613,430 | 3/1997 | Lee | 241/261 |

*Primary Examiner*—Timothy F. Simone
*Attorney, Agent, or Firm*—Rosenberg, Klein & Bilker

[57] ABSTRACT

Disclosed is a multipurpose juice extractor having a closed lower chamber for collecting residue of ground material in a compartment next to another compartment for grinding material. Juice extracted from the ground material flows via a juice outlet into a juice collector. The juice collector is provided with built-in electric heating means and can be directly heated on the juice extractor to cook the juice collected therein.

7 Claims, 9 Drawing Sheets

MULTIPURPOSE JUICE EXTRACTOR

BACKGROUND OF THE INVENTION

There are various kinds of juice extractors available in the markets to provide users with fruit, bean, and many other vegetable juice within a very short time. These juice extractors, however, can not be used to heat the extracted juice. The extracted juice must be heated, if desired, in a separate container. Care must be taken when heating the extracted juice, lest the heated juice should overflow the container. This is, of course, very troublesome to do so.

SUMMARY OF THE INVENTION

It is therefore a primary object of the present invention to provide a juice extractor which is provided with a socket for a plug provided on a specially structured juice collector to plug into and thereby allows extracted juice in the collector to be conveniently heated directly on the juice extractor.

Another object of the present invention is to provide a juice extractor which allows the residues from juice extraction to be discharged to a closed chamber inside the juice extractor or to a separate external residue collector attached to the juice extractor.

DETAILED DESCRIPTION OF THE PREFERRED EMBODIMENTS

Figure 1:
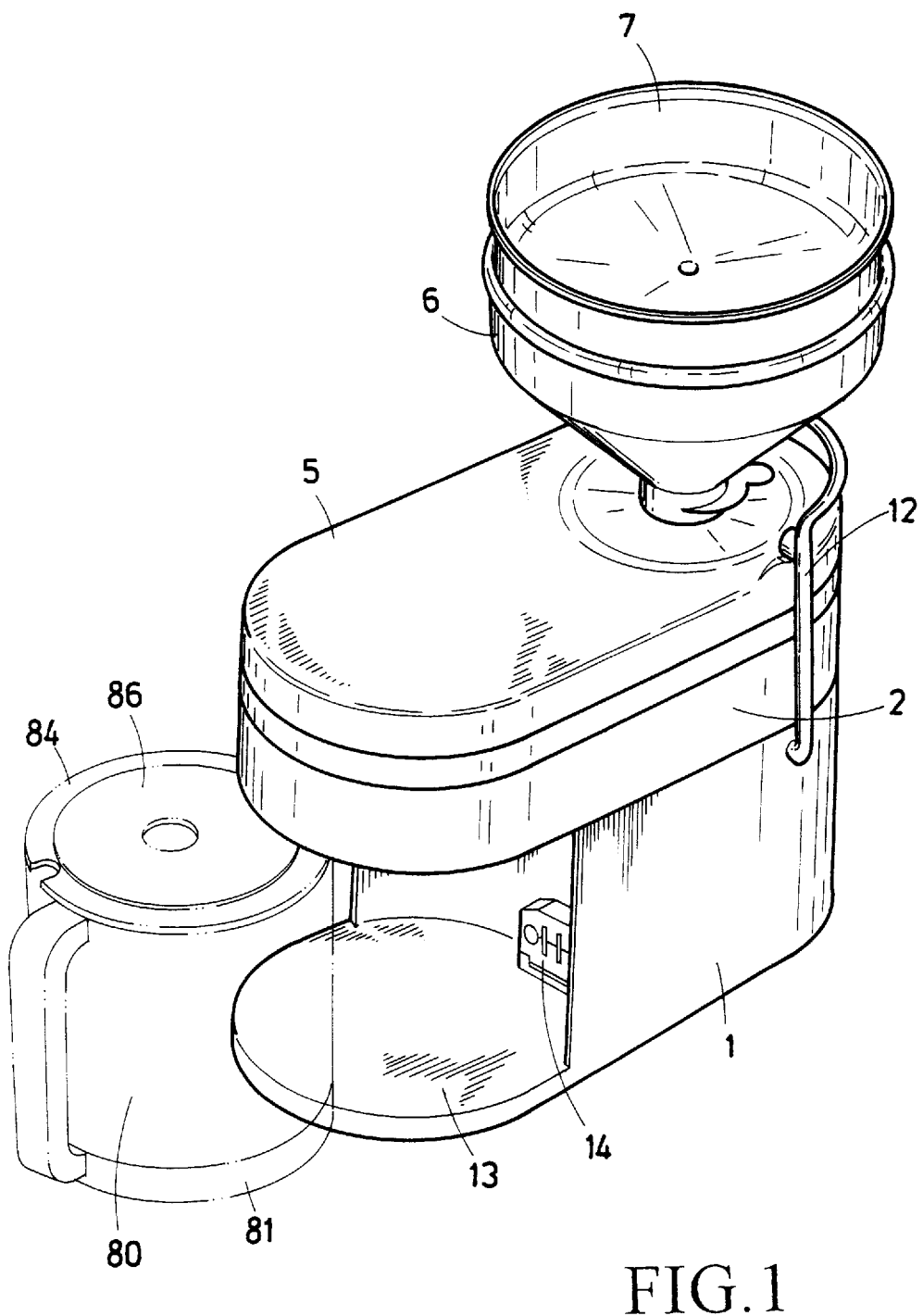
FIG. 1 is an assembled perspective of the juice extractor according to the present invention.
Figure 2:
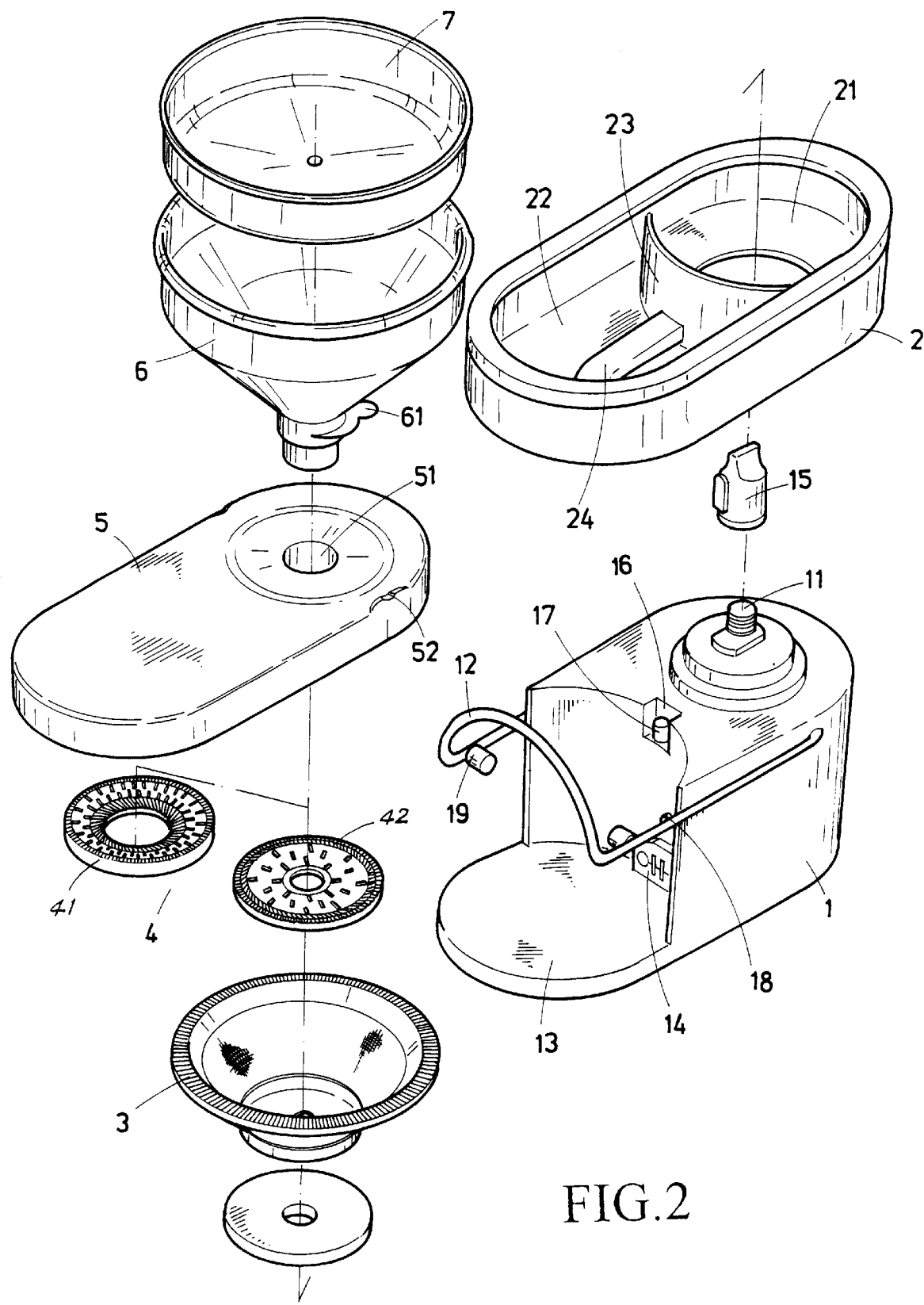
FIG. 2 is an exploded perspective of the juice extractor of the present invention.
Figure 3:
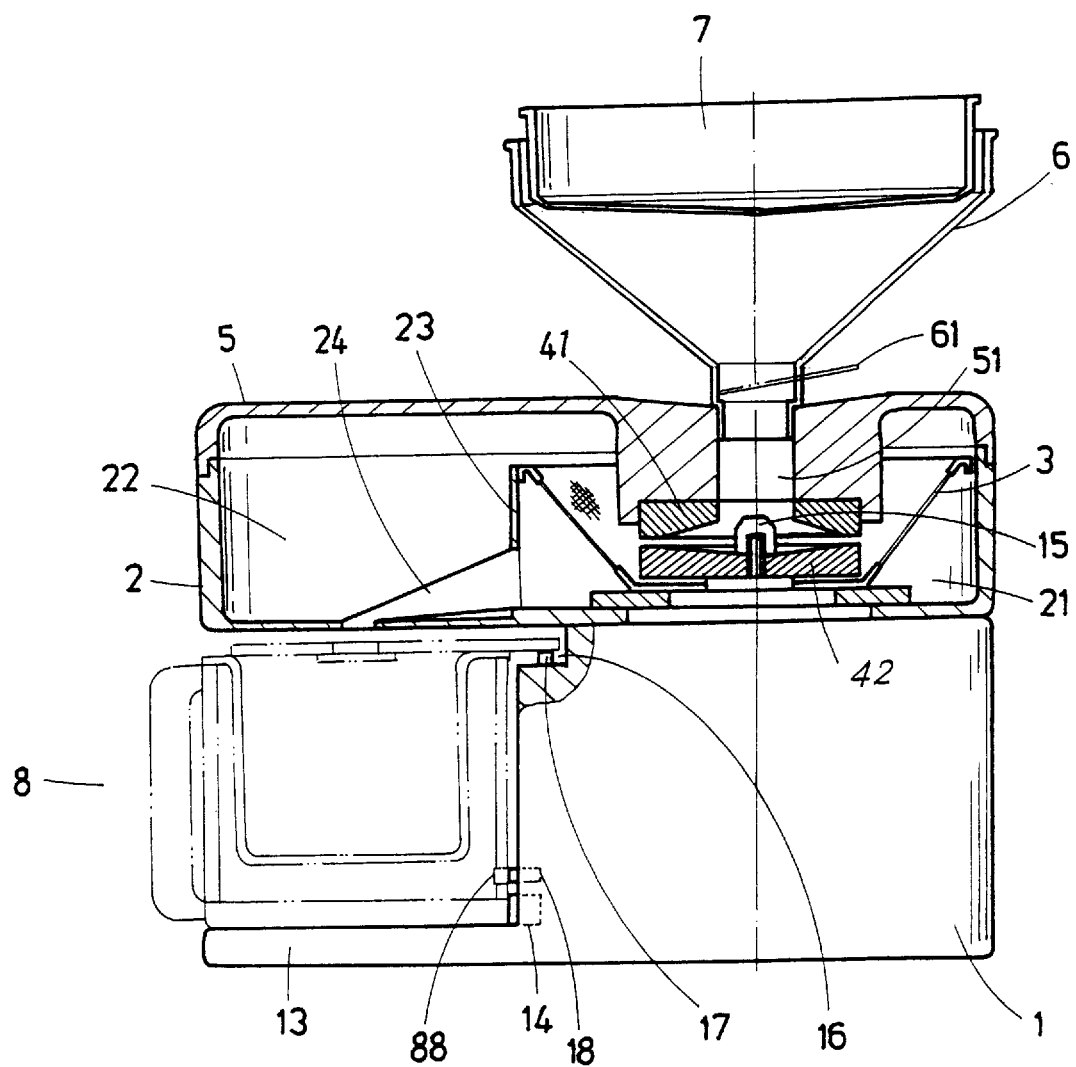
FIG. 3 is a side sectional view of the juice extractor of the present invention in an assembled state.

Please refer to FIGS. 1, 2, and 3. The present invention relates to a multipurpose juice extractor mainly including a motor base 1, a close type lower chamber 2, a filter 3, a grinding set 4, an upper cover 5, a feeding funnel 6, and a water funnel 7.

The motor base 1 contains a motor therein (not shown) and has a threaded spindle 11 of the motor upward projected from a top of the motor base 1. The motor base 1 includes a forward extended front seat 13. A socket 14 is provided to a side wall of the motor base 1 adjacent to the front seat 13 at a low position. A safety button 18 is provided above the socket 14. A recess 16 is formed on the same side wall adjacent to the front seat 13 at an upper edge thereof for a press button 17 to mount therein. A generally U-shaped frame 12 is pivotally connected at two ends to two lateral sides of the motor base 1 and has two short cylindrical shafts 19 separately rotatably connected near two inner corners of the frame 12. An internally threaded fixing cap 15 is screwed to the threaded spindle 11.

The close type lower chamber 2 is divided into a rear compartment 21 immediately above the motor base 1 and a front compartment 22 by a low partition 23. A lower portion of the partition 23 extends into the front compartment 22 to form a passage and serve as a juice outlet 24.

The filter 3 has a conic shape and is disposed in the rear compartment 21 of the close type lower chamber 2 and is fixedly located therein by engaging with the threaded spindle 11.

The grinding set 4 includes an upper grinding disc 41 adhered to a bottom surface of the upper cover 5 and a lower grinding disc 42 disposed in the filter 3 about the spindle 11 to rotate along with the spindle 11 when the motor is started.

The upper cover 5 is closed over the lower chamber 2 and has a material inlet 51 centered at a rear portion thereof. The upper grinding disc 41 is adhered to and around a bottom surface of the material inlet 51. Two retaining recesses 52 are separately provided on two top lateral edges of the upper cover 5 for receiving the two cylindrical shafts 19 of the frame 12 when the frame 12 is pulled upward to hold the cover 5, the chamber 2 and motor base 1 together.

The feeding funnel 6 has a conic shape and has a lower pointed end inserted into the material inlet 51 of the upper cover 5. An adjusting plate 61 is provided near the lower end of the feeding funnel 6 at a predetermined position for adjusting an open degree of the feeding funnel 6.

The water funnel 7 is disposed on the feeding funnel 6.

Juice extracted from material put into and ground by the juice extractor of the present invention flows out of the juice extractor via the juice outlet 24 and into a juice collector 8 disposed on the front seat 13 of the motor base 1 just below the juice outlet 24.

Figure 4:
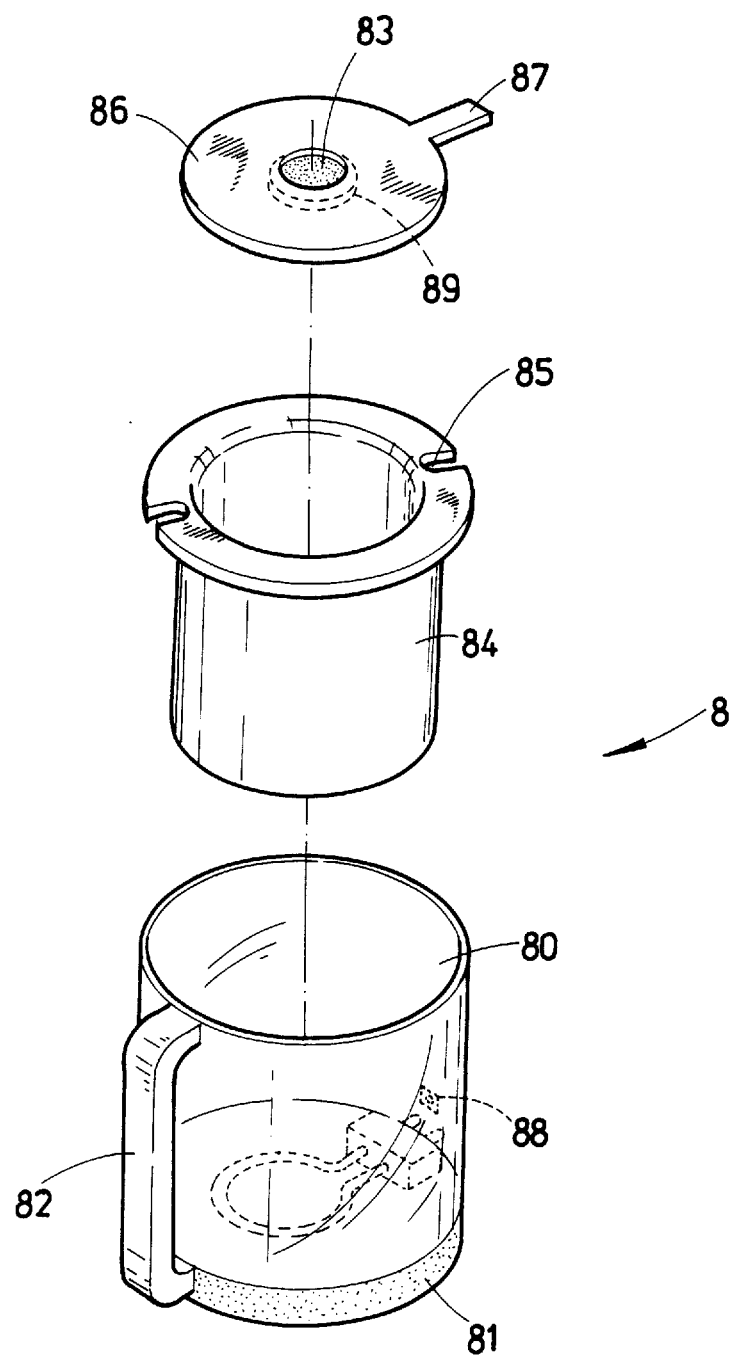
FIG. 4 is an exploded perspective of the juice collector according to the present invention.
Figure 5:
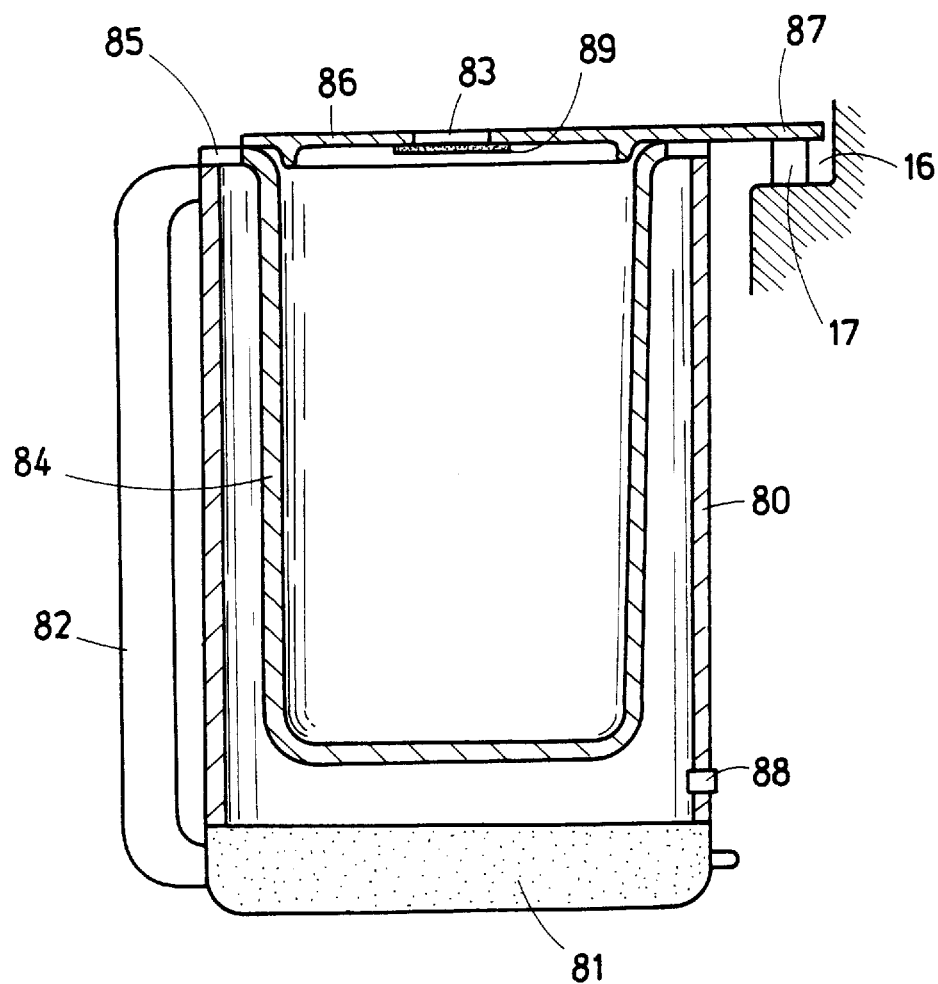
FIG. 5 is a side sectional view of the juice collector of the present invention.

Please refer to FIGS. 4 and 5, the juice collector 8 includes an outer cup 80, an inner cup 84, and a cup cover 86. The outer cup 80 has a bottom 81 which can be electrically heated, a handle 82, and an inductive block 88 which may induce the safety button 18 on the motor base 1 by contacting with the button 18. The inner cup 84 is provided around a top edge with an outward extended flange and is disposed in the outer cup 80 with the flange rested on a top rim of the outer cup 80, so that a space is left between the outer and the inner cups 80, 84 for accommodating water therein. Air vents 85 are formed on the top flange of the inner cup 84. The cup cover 86 fitly closes the inner cup 84 and is provided at a center with a juice inlet 83 and a plunger 89 mounted below the juice inlet 83. A pressing bar 87 sideward extending from an outer periphery of the cup cover 86. When the juice collector 8 is disposed on the front seat 13 below the juice outlet 24, allow the pressing bar 87 to locate in the recess 16 and touch the press button 17, as shown in FIG. 5.

Figure 6:
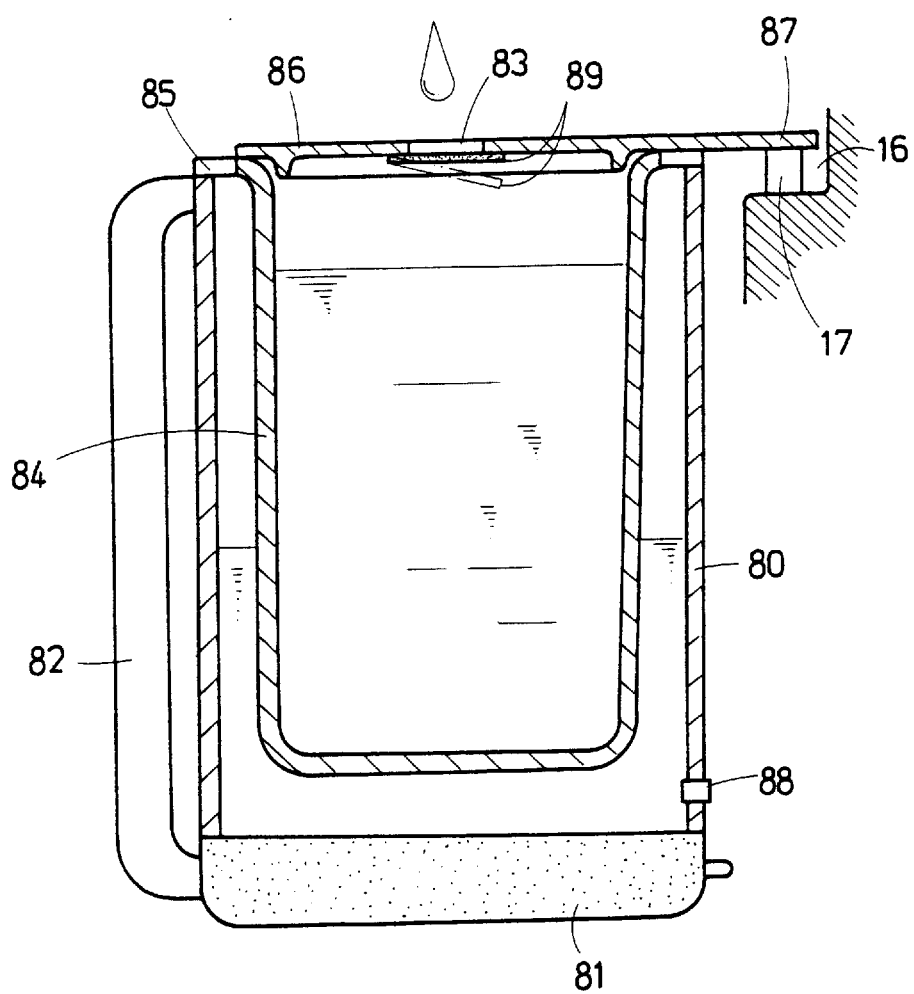
FIG. 6 shows the manner in which the extracted juice drips into the juice collector via a plunger on the cover of the juice collector.

When the extracted juice needs to heat for drinking, first put the juice collector 8 on the front seat 13 with the outer cup 80 containing an adequate amount of water therein and the pressing bar 87 of the cup cover 86 contacting with the press button 17 on the motor base 1. Material is put into the feeding funnel 6 to pass the pointed lower end which is size-adjustable by the adjusting plate 61, and is crashed and ground by the grinding discs 41 and 42 in the filter 3 disposed in the rear compartment 21 of the close type lower chamber 2. Residue of material from the juice extraction is stopped by the filter 3 from entering the juice outlet 24. Due to the low partition 23, a space is left between a top of the low partition 23 and the upper cover 5. Through the space the residue of material is centrifugally thrown out of the filter 3 to fall into the front compartment 22 of the close type lower chamber 2. On the other hand, juice extracted from the material filters through the filter 3 to flow into the juice outlet 24 and drips down into the juice collector 8 via the juice inlet 83 on the cup cover 86. The plunger 89 below the juice inlet 83 moves down to open the juice inlet 83 due to a weight of the juice dripped on the plunger 89, allowing the juice to smoothly flow down into the inner cup 84 of the juice collector 8, as shown in FIG. 6.

Figure 7:
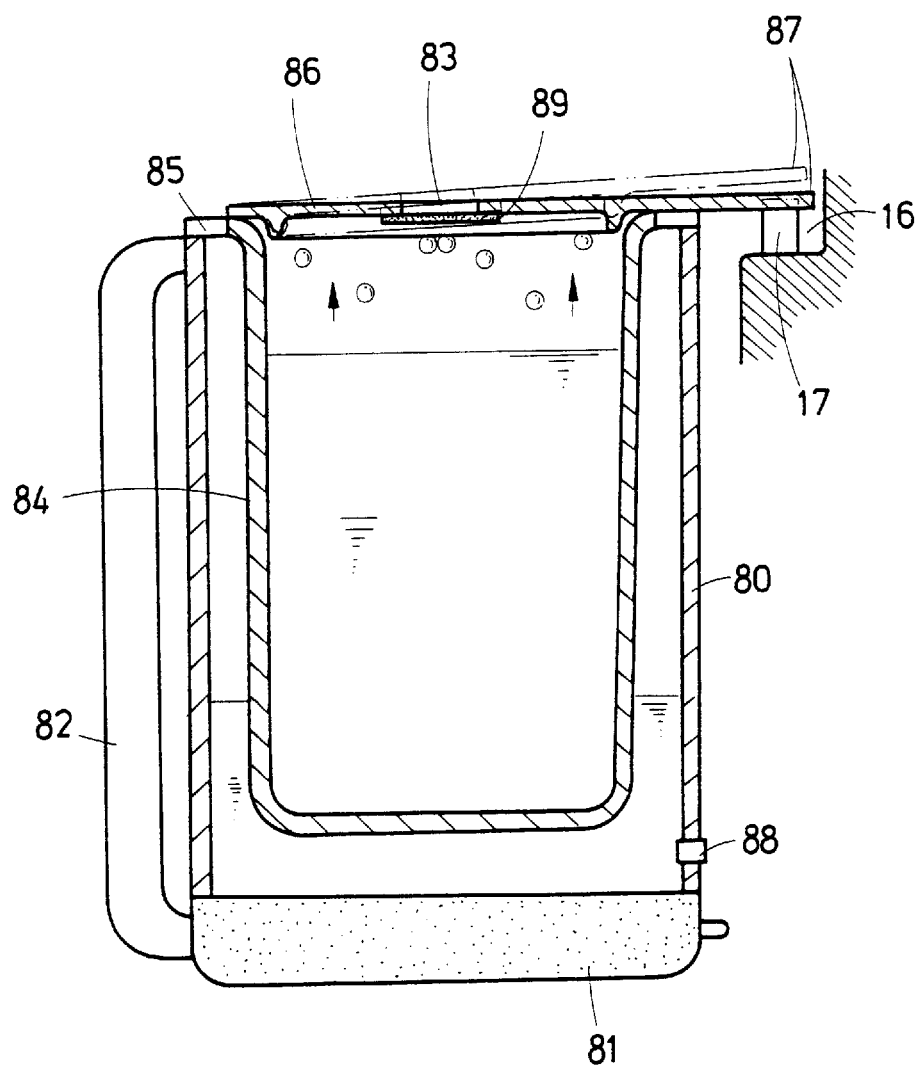
FIG. 7 shows the cover of the juice collector is slightly lefted by vapors produced by juice heated in the juice collector.

The bottom 81 of the outer cup 80 has a built-in electric heating means with a plug projected from the bottom 81. By plugging the plug provided on the bottom 81 into the socket 14 provided on the motor base 1 to one side of the front seat 13, water contained in the outer cup 80 of the juice collector 8 is electrically heated and in turn indirectly heats the juice in the inner cup 84. One advantage of this type of indirect heating is the juice can be evenly heated without easily overflowing the inner cup 84 or being charred. During heating, air inside the inner cup 84 expands and therefore pushes the plunger 89 upward to close the juice inlet 83 on the cup cover 86. When the heating continues to boil the juice, bubbles produced by the boiled juice vaporize and move upward to slightly lift the cup cover 86, causing the press bar 87 to separate from the press button 17, as shown in FIG. 7. In the instant the press button 17 is released from the pressing bar 87, the bottom 81 is disconnected from its power source or is switched to a predetermined constant temperature via a control circuit (not shown) inside the motor base 1. At this point, the juice collector 8 can be removed from the front seat 13 for drink.

In the event there is no water in the outer cup 80 or a water level in the outer cup 80 becomes lower than the inductive block 88 on the outer cup 80 due to vaporization during the process of heating, the safety button 18 on the motor base 1 will be induced through contact with the inductive block 88 to cause the control circuit to disconnect power supplied to the bottom 81 of the outer cup 80, and emits warning signal for replenishment of water.

In the case the extracted juice needs not to heat, a general juice collector can be used in place of the juice collector 8 of the present invention.

Figure 8:
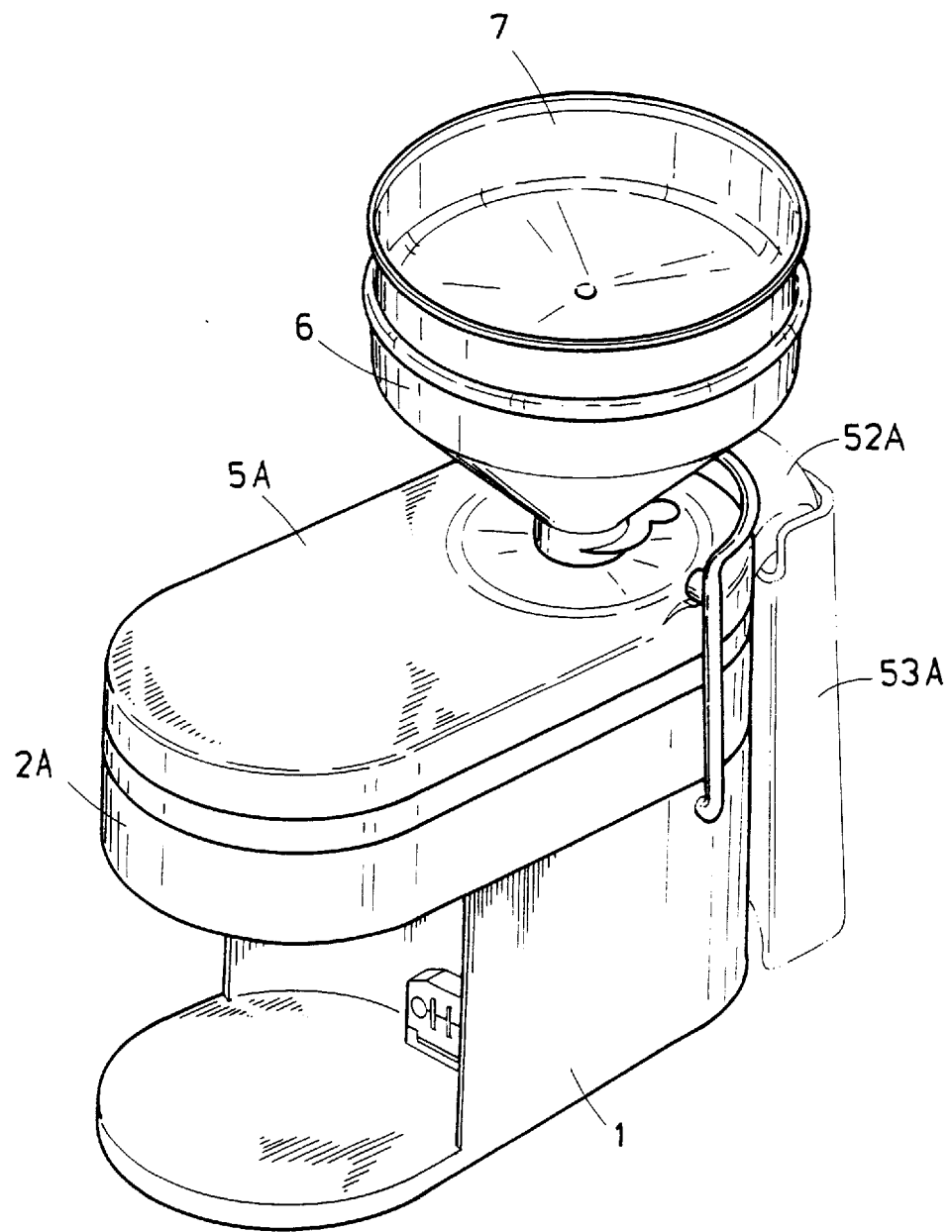
FIG. 8 illustrates the juice extractor of the present invention with externally attached residue collector.
Figure 9:
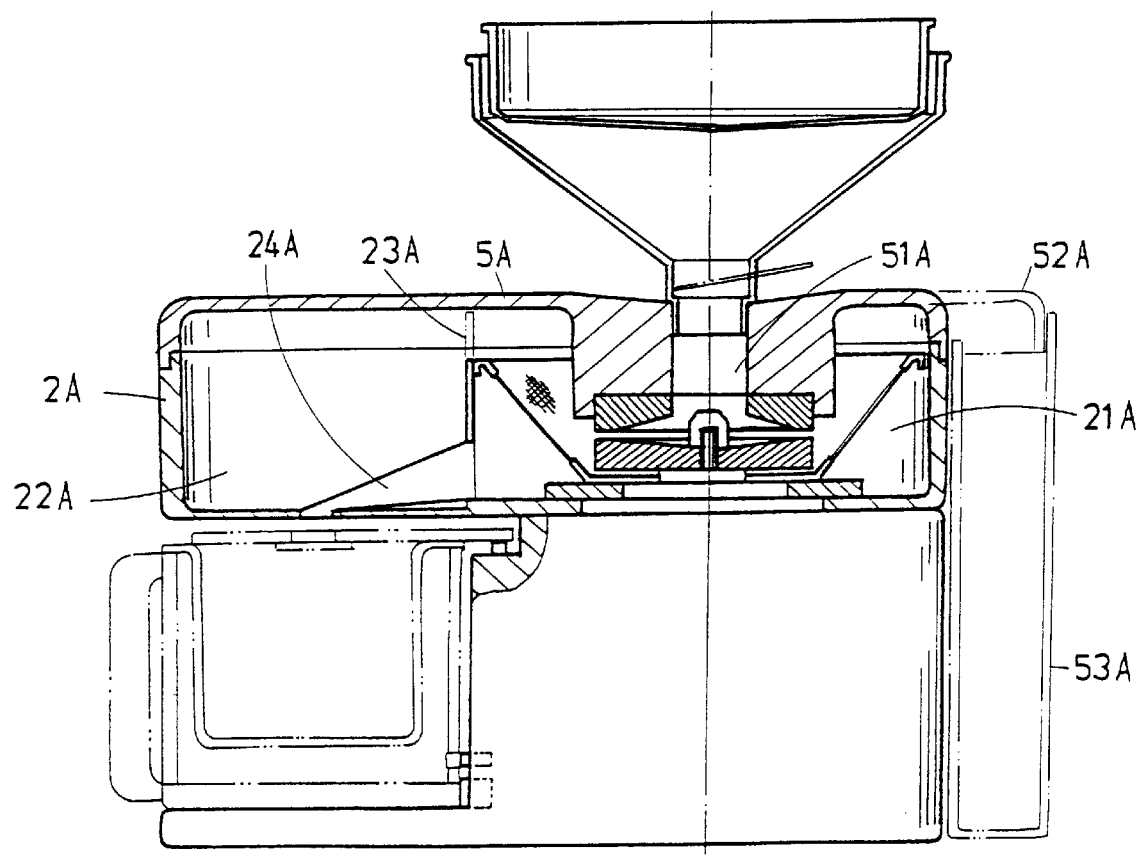
FIG. 9 is an assembled side sectional view of the juice extractor of FIG. 8.

Please refer to FIGS. 8 and 9 in which another embodiment of the present invention is shown. This second embodiment has a structure substantially the same as that of the first embodiment described above, except that the juice extractor in this second embodiment has a lower chamber 2A including a high partition 23A to divide the lower chamber 2A into a front compartment 22A and a rear compartment 21A, an upper cover 5A being provided at a rear end with an extended cover portion 52A for guiding and discharging residue of material from juice extraction, and a separate residue box 53A being detachably connected to a rear end of the motor base 1 below the extended cover portion 52A of the upper cover 5A to collect residue discharged from the extended cover portion 52A. A juice outlet 24A is also formed at a lower portion of the high partition 23A to extend into the front compartment 22A. When the upper cover 5A is closed to a top of the lower chamber 2A, it together with the high partition 23A to completely separate the front and the rear compartment 22A, 21A from one another, preventing any residue from entering into the front compartment 22A. Any and all residue is centrifugally thrown out by the rotating filter 3 to the extended cover portion 52A of the upper cover 5A and discharged into the residue box 53A below the extended cover portion 52A.

What is claimed is:

1. A multipurpose juice extractor, comprising:

a motor base having a threaded spindle extended from a motor inside said motor base to project from a top of said motor base, said motor base also having a forward extended front seat with a power source socket provided at a low position of a side wall of said motor base adjacent to said front seat, a safety button provided slightly above said socket, and a recess formed at a top edge of said side wall for a press button to mount therein; a generally U-shaped frame being pivotally connected at two free ends to two lateral sides of said motor base with two rotatable cylindrical shafts connected near two inner corners of said frame; and an internally threaded cap being screwed onto said threaded spindle;

a lower chamber being located on said motor base and devided into a front and a rear compartment by a partition, said partition having a lower portion extending into said front compartment to form a juice outlet; said threaded spindle of said motor base upward projecting into said rear compartment;

a filter being disposed about said threaded spindle in said rear compartment of the lower chamber, such that said filter rotates along with said threaded spindle when said motor is started;

a grinding set including an upper grinding disc adhereing to a bottom surface of an upper cover of said juice extractor and a lower grinding disc disposed in said filter and fixed about said threaded spindle by said internally threaded cap;

an upper cover being covered over said lower chamber to close said lower chamber, a material inlet being formed on said upper cover corresponding to said rear compartment of said lower chamber and said upper grinding disc being adhered to a lower surface around said material inlet, two retaining recesses being separately formed on two lateral top edges of said upper cover to receive said two rotatable cylindrical shafts of said frame on said motor base when said frame is pulled upward to hold said upper cover, said lower chamber, and said motor base together;

a feeding funnel being inserted into said material inlet on said upper cover for receiving material to be ground, said feeding funnel having an adjusting plate provided near a lower end thereof for adjusting an openness of said feeding funnel;

a water funnel being disposed on said feeding funnel for controlling water amount poured into said feeding funnel during grinding a material; and a juice collector being disposed in said front seat of said motor base below said juice outlet for collecting juice extracted from material ground by said juice extractor, said juice collector including an outer cup for containing water therein and having a bottom provided with a built-in electric heating means and an inductive block provided on a wall near said bottom, an inner cup having a top flange for resting said inner cup on a top rim of said outer cup, and a cup cover having a centered juice inlet; said juice collector being so positioned in said front seat that said inductive block on said outer cup contacts with and induces said safety button on said motor base, said top flange of said inner cup being provided with air vents, and said cup cover being provided at one side with an extended pressing bar and at a lower surface of said juice inlet with a plunger to open or close said juice inlet.

2. A multipurpose juice extractor as claimed in claim 1, wherein said built-in electric heating means in said bottom of said outer cup has a plug projecting from said bottom, and wherein said juice collector is disposed in said front seat of said motor base with said plug on said outer cup plugged into said power source socket on said motor base to heat juice collected in said juice collector.

3. A multipurpose juice extractor as claimed in claim 1, wherein said partition of said lower chamber has a height that allows a space to form between a top of said partition and said upper cover, so that residue of said material having been ground is centrifugally discharged from said filter into said front compartment of said lower chamber via said space above said partition.

4. A multipurpose juice extractor as claimed in claim 1, wherein said partition of said lower chamber has a height that leaves no space between a top of said partition and said upper cover, and wherein said upper cover has an extended cover portion projected from a rear end thereof, whereby residue of said material having been ground is centrifugally thrown out from said filter into said extended cover portion of said upper cover and be discharged out of said juice extractor from said extended cover portion.

5. A multipurpose juice extractor as claimed in claim 1, wherein said juice collector is positioned in said front seat of said motor base with said pressing bar of said cup cover contacting with said press button on said motor base, whereby a disengagement of said pressing bar from said press button shall actuate a control circuit inside said motor base to disconnect power supplied from said socket on said motor base to said plug of said juice collector.

6. A multipurpose juice extractor as claimed in claim 1, wherein said inductive block on said juice collector shall induce said safety button on said motor base to actuate a control circuit inside said motor base to disconnect power supplied from said socket on said motor base to said plug of said juice collector when water contained in said outer cup is lower than said inductive block due to vaporization during heating.

7. A multipurpose juice extractor as claimed in claim 2, wherein juice extracted from material put into and ground by said juice extractor flows via said juice outlet of said lower chamber into said inner cup of said juice collector and is indirectly heated by water that is contained in said outer cup and directly heated by said electric heating means built in said bottom of said outer cup.

* * * * *